United States Patent [19]
Columbus et al.

[11] Patent Number: 6,036,761
[45] Date of Patent: Mar. 14, 2000

[54] SOLVENT BASED WOOD FILLER

[75] Inventors: Peter S. Columbus, Melville, N.Y.; Yogeshbhai B. Patel, Gahanna, Ohio

[73] Assignee: Elmer's Products, Inc., Columbus, Ohio

[21] Appl. No.: 09/371,175

[22] Filed: Aug. 11, 1999

[51] Int. Cl.[7] ............................ C09D 5/34; C09D 101/18; C09D 197/02
[52] U.S. Cl. .......................................... 106/162.5
[58] Field of Search ........................................ 106/162.5

[56] References Cited

U.S. PATENT DOCUMENTS

| | | | |
|---|---|---|---|
| 1,947,438 | 2/1934 | Walsh | 106/162.5 |
| 2,095,652 | 10/1937 | Silberman | 106/162.5 |
| 2,105,111 | 1/1938 | Esselen | 106/162.5 |
| 2,461,900 | 2/1949 | Johnson | 106/162.5 |

*Primary Examiner*—David Brunsman
*Attorney, Agent, or Firm*—Standley & Gilcrest LLP

[57] ABSTRACT

The present invention includes several embodiments of solvent-based wood fillers comprising an organic solvent component, nitrocellulose, calcium carbonate, a filler selected from aluminum silicate and magnesium silicate and mixtures thereof, and, wood flour. The wood filler of the present invention is easy to apply yet dries in a relative short time, and can be stained sufficiently to match the appearance of the surrounding wood to which it is applied.

19 Claims, No Drawings

SOLVENT BASED WOOD FILLER

TECHNICAL FIELD OF THE INVENTION

The present invention relates to a solvent-based filler for wood products, and relates particularly to a wood filler that is capable of being stained or finished.

BACKGROUND OF THE INVENTION

Wood fillers are used in the construction and furniture industries to repair soft or hard wood or wood products, and also by contractors and do-it-yourself consumers to repair or cure imperfections in furniture or woodwork, often where the wood has been cracked or otherwise been damaged.

It is desirable that wood be able to maintain its natural beauty, such as when wood is stained to show the grain, it must not be readily apparent that a filler has been applied to the wood. It is therefore important that the filler be able to be smoothed even with the wood surface, and be able to match the color of the wood both before and after any staining.

There are several beneficial characteristics to be achieved in a wood filler product.

The wood filler should be easily spreadable, and should spread without the filler breaking up as it is spread.

A wood filler also most advantageously has a sufficiently long working time to allow the wood filler to be worked into a desired form or surface before setting. It is also desirable to produce a wood filler that also has a relatively short setting time, so that the wood filler sets to a point where it can be sanded or otherwise finished in a relatively short period of time.

In this regard, it is also beneficial to produce a wood filler that may be sanded without clogging the sand paper or other abrading media (that may reduce its efficacy). It is also beneficial to produce a wood filler that does not shrink or crack upon drying. Another beneficial characteristic in a wood filler is to have a relatively low post-drying density which bears a relation to the ability of the filler resist cracking or shrinking upon drying.

It is also desirable that the wood filler have uniform staining characteristics, to resist over-staining or under-staining.

It is therefore an object of the invention to create a wood filler having all of the above desirable characteristics; including being easy to use, having effective working and setting times, while being able to be easily and conveniently sanded, and capable of being easily and properly stained to match the appearance of the surrounding wood.

Although described with respect to a wood filler, it will be appreciated that similar advantages of easy application and surface matching may be obtained in other applications of the present invention. Such advantages may become apparent to one of ordinary skill in the art in light of the present disclosure or through practice of the invention.

SUMMARY OF THE INVENTION

The present invention includes several embodiments of a solvent-based wood filler.

The present invention includes a solvent based wood filler composition comprising: (a) an organic solvent component present in the amount of from about 25% to about 38% by weight; (b) an effective amount of nitrocellulose, such as that present in the amount of from about 3% to about 8% by weight; (c) calcium carbonate present in the amount of from about 40% to about 50% by weight; (d) a filler material selected from the group of aluminum silicate and magnesium silicate and mixtures thereof, present in the amount of from about 0.5% to about 10% by weight; and (e) wood flour present in the amount of from about 4% to about 12% by weight. The aluminum silicate and magnesium silicate (e.g., clay and talc) reduce the density of the product to improve the spreadability of the product, and have a whitening effect on the wood filler that will tend to prevent over-staining.

It is preferred that the ratio of the calcium carbonate to the filler material is in the range of from about 4:1 to about 50:1.

It is also preferred that the ratio of the wood flour to the filler material is in the range of from about 2:1 to about 4:1.

It is also preferred that the solvent based wood filler composition additionally comprise a tall oil rosin present in the amount of from about 1% to about 5% by weight. The tall oil rosin acts as a tackifier and binder.

The solvent based wood filler composition may also contain a plasticizer present in the amount of from about 4% to about 12% by weight of the nitrocellulose. An example of an acceptable plasticizer is dipropylene glycol dibenzoate.

The solvent based wood filler composition may also include a dispersing agent present in the amount of from about 0.25% to about 1.50% by weight, such as zinc stearate.

According to the desired end use, the solvent based wood filler composition may be provided with at least one pigment.

The solvent component of the solvent based wood filler composition preferably is predominantly acetone, and may include a mixture such as (a) methyl ethyl ketone present in the amount of from about 4% to about 8% by weight of the composition, (b) naphtha present in the amount of from about 1% to about 4% by weight of the composition; and (c) acetone present in the amount of from about 15% to about 25% by weight of the composition.

In a preferred embodiment, the solvent based wood filler composition may comprise: (a) an organic solvent component present in the amount of from about 25% to about 38% by weight; (b) nitrocellulose present in the amount of from about 3% to about 8% by weight; (c) calcium carbonate present in the amount of from about 40% to about 50% by weight; (d) a filler material selected from the group of aluminum silicate and magnesium silicate and mixtures thereof, present in the amount of from about 0.5% to about 10% by weight; (e) wood flour present in the amount of from about 4% to about 12% by weight; (f) a tall oil rosin present in the amount of from about 1% to about 5% by weight; (g) a plasticizer present in the amount of from about 4% to about 12% by weight; and (h) a dispersing agent present in the of from about 0.25% to about 1.50% by weight. This embodiment may include the optional and preferable components otherwise set forth above.

In a preferred embodiment, the solvent based wood filler composition comprises: (a) an organic solvent component present in the amount of from about 28% to about 32% by weight; (b) nitrocellulose present in the amount of from about 5% to about 7% by weight; (c) calcium carbonate present in the amount of from about 45% to about 50% by weight; (d) a filler material selected from the group of aluminum silicate and magnesium silicate and mixtures thereof (preferably only aluminum silicate in the form of clay), present in the amount of from about 1% to about 5% by weight; and (e) wood flour present in the amount of from about 6% to about 9% by weight. Where the filler is aluminum silicate, it is preferred to be present in the amount of from about 2% to about 4%.

This embodiment may include the optional and preferable components otherwise set forth above.

The nitrocellulose preferably is a Hercules nitrocellulose RS 125–175 seconds grade, with an isopropyl alcohol wetting system, which is commercially available from the Aqualon Division of Hercules Incorporated of Wilmington, Del.

The aluminum silicate may be in the form of Kaolin ASP-400, commercially available from Engelhard Corporation of Edison, N.J.

The magnesium silicate may be in the form of talc, and where admixed with the aluminum silicate component, preferably may be used at a level of about half of the aluminum silicate.

The wood flour preferably is pine wood flour.

In the preferred embodiment, the following components may be used: The Pamite 79 Tall Oil Rosin was commercially available from Hercules Incorporated of Wilmington, Del. The Benzoflex 9-88 is commercially available from the Velsicol Chemical Corporation of Rosemont, Ill. The zinc stearate (SYNPRO Zinc Stearate ACF) is commercially available from the Ferro Corporation of Walton Hills, Ohio; an alternative is Kedex 515. The GSP-40 (Calcium Carbonate) is commercially available from ECC International of Rosewell, Ga. The ASP 400 clay is commercially available from the Englehard Corporation of Edison, N.J. The Pine Wood Flour 8020 is commercially available from American Wood Fibers of Schofield, Wis. The Bayerrox Pigments (Yellow, Red, Black) are commercially available from the Bayer Corporation of Pittsburgh, Pa.

The wood filter of the present invention achieves the balance necessary to obtain a wood filler that is easy spreading while having a relatively short setting time, and desirable staining characteristics.

DETAILED DESCRIPTION OF THE PREFERRED EMBODIMENTS

In accordance with the foregoing summary, the following presents a detailed description of the preferred embodiments of the invention including that currently considered to be the best mode.

EXAMPLE 1 (Preferred Embodiment Composition)

Currently believed to be the best mode, a composition A was made according to the following formula:

| | | % by Weight |
|---|---|---|
| 1. | Methyl Ethyl Ketone | 6.00% |
| 2. | VM&P Naphtha (b.p. 240–260° F.) | 2.66% |
| 3. | Wood Rosin | 3.00% |
| 4: | Nitrocellulose 6.1 parts/ isopropanol 2.7 parts | 8.80% |
| 5. | Acetone | 21.20% |
| 6. | Benzoflex 9-88 | 0.66% |
| 7. | Zinc Stearate | 0.50% |
| 8. | GSP-40 limestone (calcium carbonate) | 46.15% |
| 9. | ASP-400 (clay; aluminum silicate) | 2.50% |
| 10. | Wood Flour | 8.00% |
| 11. | Pigments (i.e., Bayferrox Yellow 3420, Red 110M, and Black 318M | <1.00% (added as desired to obtain desired color) |

The expected viscosity is in the range of about 400,000 to 700,000 Cps., the total solids were present in an amount of about 67.5+/−1.00%, and the weight of the product was 11.8+/−0.2 lbs.

In order to mix the components, the following procedure was used in light of raw material MSDS safety and handling information:

1. Components (1), (2) and (3) were added to a clean, dry tank under slow agitation. Mixing was continued until component (3) was completely dissolved.
2. In a separate vessel, dissolve component (4) in component (5), and add this solution with continued mixing to the batch obtained in step 1.
3. Continue mixing with the addition of components (6), (7), (8), (9) and (10). Mixing is done slowly to avoid dusting of components (7), (8), (9) and (10).
4. In a separate container pigments are weighed according to the desired color, and mixed with a small amount of component (2), prior to being added to the batch obtained in step 3.
5. Mixing is continued until color is uniform.
6. Final viscosity is adjusted with acetone, if needed.
7. Product can then be moved to filling equipment.

The foregoing procedure, or an analogous procedure, may be used with the following illustrative and comparative examples.

EXAMPLE 2 (Comparative Composition)

A composition B was made according to the following formula:

| | % by Weight |
|---|---|
| Acetone | 34.40% |
| MEK | 4.50% |
| VM&P Naphtha | 2.00% |
| Wood Rosin | 4.00% |
| Nitrocellulose 7.5 parts/isopropanol 3.2 parts | 10.70% |
| Benzoflex 9-88 | 0.50% |
| Zinc Stearate | 0.50% |
| Wood Flour | 13.86% |
| GSP-40 Limestone (calcium carbonate) | 30.00% |
| Pigments | <1.00% |

This composition exhibited good manageability during mixing and longer open time during application. The composition exhibited virtually no shrinkage. However, this composition would over-stain, and thus was unacceptable.

EXAMPLE 3 (Comparative Composition)

A composition C was made according to the following formula:

|  | % by Weight |
|---|---|
| Acetone | 26.71% |
| MEK | 6.00% |
| VM&P Naphtha | 2.66% |
| Wood Rosin | 3.66% |
| Nitrocellulose 5.82 parts/isopropanol 2.5 parts | 8.32% |
| Benzoflex 9-88 | 0.66% |
| Zinc Stearate | 0.66% |
| GSP-40 Limestone (calcium carbonate) | 40.00% |
| Wood Flour | 11.33% |
| Pigments | <1.00% |

This product was somewhat better than that of composition B, but was still given to overstaining, and was therefore not acceptable.

EXAMPLE 4 (Alternative Composition)

A composition D was made by taking 200 grams of composition C and adding an additional 2 grams of acetone and 5 grams of clay. This formulation was marginally acceptable from the standpoint of staining characteristics.

EXAMPLE 5 (Alternative Composition)

A composition E was made according to the following formula:

|  | % by Weight |
|---|---|
| Acetone | 24.20% |
| MEK | 6.00% |
| VM&P Naphtha | 2.66% |
| Wood Rosin | 3.66% |
| Nitrocellulose 5.82 parts/isopropanol 2.5 parts | 8.32% |
| Benzoflex 9-88 | 0.66% |
| Zinc Stearate | 0.66% |
| GSP-40 Limestone (calcium carbonate) | 37.51% |
| Wood Flour | 11.33% |
| Clay | 5.00% |
| Pigments | <1.00% |

This formulation was acceptable from the standpoint of staining characteristics, and retained solvent well to provide desired working and setting times.

EXAMPLE 6 (Alternative Composition)

A composition F was made according to the following formula:

|  | % by Weight |
|---|---|
| Acetone | 24.20% |
| MEK | 6.00% |
| VM&P Naphtha | 2.66% |
| Wood Rosin | 3.66% |
| Nitrocellulose 5.82 parts/isopropanol 2.5 parts | 8.32% |
| Benzoflex 9-88 | 0.66% |
| Zinc Stearate | 0.66% |
| GSP-40 Limestone (calcium carbonate) | 35.01% |
| Wood Flour | 11.33% |
| Clay |  |
| Pigments | <1.00% |

This composition exhibited good manageability during mixing and longer open time with no shrinkage. However, this composition would slightly over-stain, and was therefore not as acceptable as the preferred composition.

EXAMPLE 7 (Alternative Composition)

A composition G was made according to the following formula:

|  | % by Weight |
|---|---|
| Acetone | 24.20% |
| MEK | 6.00% |
| VM&P Naphtha | 2.66% |
| Wood Rosin | 3.00% |
| Nitrocellulose 4.2 parts/isopropanol 1.8 parts | 6.00% |
| Benzoflex 9-88 | 0.66% |
| Zinc Stearate | 0.50% |
| GSP-40 Limestone (calcium carbonate) | 46.48% |
| Wood Flour | 8.00% |
| Clay | 2.50% |
| Pigments | <1.00% |

This composition was satisfactory from the standpoint of staining and speadability, although the binder was less than the preferred composition.

EXAMPLE 8 (Comparative Composition)

A composition H was made according to the following formula:

|  | % by Weight |
|---|---|
| Acetone | 9.00% |
| MEK | 9.00% |
| VM&P Naphtha | 4.00% |
| Wood Rosin | 3.00% |
| Nitrocellulose 2.8 parts/isopropanol 1.2 parts | 4.00% |
| Mineral Oil | 1.00% |
| Benzoflex 9-88 | 1.00% |
| Zinc Stearate | 1.00% |
| calcium carbonate | 56.00% |
| Wood Flour | 6.00% |
| Pigments | <1.00% |

This product was easy to sand, and accepted a stain reasonably well. However, this composition exhibited difficult spreading properties, with excessive crumbling and poor surface wetting and hole-filling properties.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A solvent based wood filler composition comprising:
   (a) an organic solvent component present in the amount of from about 25% to about 38% by weight;
   (b) nitrocellulose present in the amount of from about 3% to about 8% by weight;
   (c) calcium carbonate present in the amount of from about 40% to about 50% by weight;
   (d) a filler material selected from the group consisting of aluminum silicate, magnesium silicate and mixtures thereof, present in the amount of from about 0.5% to about 10% by weight; and
   (e) wood flour present in the amount of from about 4% to about 12% by weight.

2. A solvent based wood filler composition according to claim 1 wherein the ratio of the calcium carbonate to the filler material is in the range of from about 4:1 to about 10:1.

3. A solvent based wood filler composition according to claim 1 wherein the ratio of the wood flour to the filler material is in the range of from about 2:1 to about 4:1.

4. A solvent based wood filler composition according to claim 3 wherein said plasticizer is dipropylene glycol dibenzoate.

5. A solvent based wood filler composition according to claim 1 additionally comprising a tall oil rosin present in the amount of from about 1% to about 5% by weight.

6. A solvent based wood filler composition according to claim 1 additionally comprising a plasticizer present in the amount of from about 4% to about 12% by weight of said nitrocellulose.

7. A solvent based wood filler composition according to claim 6 wherein said dispersing agent is zinc stearate.

8. A solvent based wood filler composition according to claim 1 additionally comprising a dispersing agent present in the amount of from about 0.25% to about 1.50% by weight.

9. A solvent based wood filler composition according to claim 1 additionally comprising at least one pigment.

10. A solvent based wood filler composition according to claim 1 wherein said organic solvent component includes (a) methyl ethyl ketone present in the amount of from about 4% to about 8% by weight of said composition, (b) naphtha present in the amount of from about 1% to about 4% by weight of said composition; and (c) acetone present in the amount of from about 15% to about 25% by weight of said composition.

11. A solvent based wood filler composition according to claim 1 wherein said filler material is aluminum silicate present in the amount of from about 2% to about 4%.

12. A solvent based wood filler composition comprising:
   (a) an organic solvent component present in the amount of from about 25% to about 38% by weight;
   (b) nitrocellulose present in the amount of from about 3% to about 8% by weight;
   (c) calcium carbonate present in the amount of from about 40% to about 50% by weight;
   (d) a filler material selected from the group consisting of aluminum silicate, magnesium silicate and mixtures thereof, present in the amount of from about 0.5% to about 10% by weight; and
   (e) wood flour present in the amount of from about 4% to about 12% by weight;
   (f) a tall oil rosin present in the amount of from about 1% to about 5% by weight;
   (g) a plasticizer present in the amount of from about 4% to about 12% by weight; and
   (h) a dispersing agent present in the of from about 0.25% to about 1.50% by weight.

13. A solvent based wood filler composition according to claim 12 wherein the ratio of said calcium carbonate to said filler material is in the range of from about 4:1 to about 10:1.

14. A solvent based wood filler composition according to claim 12 wherein the ratio of the wood flour to the filler material is in the range of from about 2:1 to about 4:1.

15. A solvent based wood filler composition according to claim 12 wherein said plasticizer is dipropylene glycol dibenzoate.

16. A solvent based wood filler composition according to claim 12 wherein said dispersing agent is zinc stearate.

17. A solvent based wood filler composition according to claim 12 additionally comprising at least one pigment.

18. A solvent based wood filler composition according to claim 12 wherein said organic solvent component includes (a) methyl ethyl ketone present in the amount of from about 4% to about 8% by weight of said composition, (b) naphtha present in the amount of from about 1% to about 4% by weight of said composition; and (c) acetone present in the amount of from about 15% to about 25% by weight of said composition.

19. A solvent based wood filler composition comprising:
   (a) an organic solvent component present in the amount of from about 28% to about 32% by weight;
   (b) nitrocellulose present in the amount of from about 5% to about 7% by weight;
   (c) calcium carbonate present in the amount of from about 45% to about 50% by weight;
   (d) a filler material selected from the group consisting of aluminum silicate, and magnesium silicate and mixtures thereof, present in the amount of from about 1% to about 5% by weight; and
   (e) wood flour present in the amount of from about 6% to about 9% by weight.

* * * * *

UNITED STATES PATENT AND TRADEMARK OFFICE
CERTIFICATE OF CORRECTION

PATENT NO: 6,036,761
DATED: March 14, 2000
INVENTOR(S): Columbus, et al.

It is certified that error appears in the above-identified patent and that said Letters Patent is hereby corrected as shown below:

In column 2, line 6, after "weight", please insert a new paragraph starting with the phrase "The aluminum ...".

In column 6, in the table for Example 6, line 8, directly across from the word "Clay" under the column marked "% by Weight", please insert -- 7.50% --.

Signed and Sealed this

Thirteenth Day of February, 2001

Attest:

NICHOLAS P. GODICI

Attesting Officer

Acting Director of the United States Patent and Trademark Office